(12) United States Patent
Woerner et al.

(10) Patent No.: US 6,820,945 B2
(45) Date of Patent: Nov. 23, 2004

(54) SYSTEM FOR CONTROLLING BRAKE VALVES

(75) Inventors: Dieter Woerner, Eppingen (DE); Martin Blanc, Knittlingen/Kleinvillars (DE); Michael Herges, Korntal-Muenchingen (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 10/290,260

(22) Filed: Nov. 8, 2002

(65) Prior Publication Data

US 2003/0052535 A1 Mar. 20, 2003

Related U.S. Application Data

(63) Continuation of application No. PCT/EP01/13581, filed on Nov. 22, 2001.

(30) Foreign Application Priority Data

Nov. 22, 2000 (DE) .......................................... 100 57 900

(51) Int. Cl.⁷ ........................... G05D 16/20; B60T 8/36; B60T 13/68

(52) U.S. Cl. .................................... 303/119.2; 137/557

(58) Field of Search ........................ 137/596.1, 596.16, 137/596.17, 596.18, 596.2, 628.5, 558; 303/119.2, 119.3, 119.1, 168, 156

(56) References Cited

U.S. PATENT DOCUMENTS

| | | | | |
|---|---|---|---|---|
| 3,921,666 A | * | 11/1975 | Leiber | 137/557 |
| 5,031,968 A | * | 7/1991 | Takata | 303/119.2 |
| 6,116,269 A | * | 9/2000 | Maxson | 137/557 |

FOREIGN PATENT DOCUMENTS

| | | |
|---|---|---|
| DE | 4241121 | 7/1993 |
| DE | 19616815 | 2/1997 |
| DE | 19610665 | 9/1997 |
| DE | 19635253 | 9/1997 |
| DE | 19723931 | 12/1998 |
| DE | 19937475 | 2/2001 |

\* cited by examiner

*Primary Examiner*—Matthew C. Graham
(74) *Attorney, Agent, or Firm*—Crowell & Moring LLP

(57) ABSTRACT

In a system for controlling a brake valve, the supply voltage available for controlling the electromagnet of the brake valve is continually measured during operation and the effective value of the voltage present at the coil of the electromagnet is varied by varying the duty factor of the pulse times according to the supply voltage supplied at the time.

28 Claims, 3 Drawing Sheets

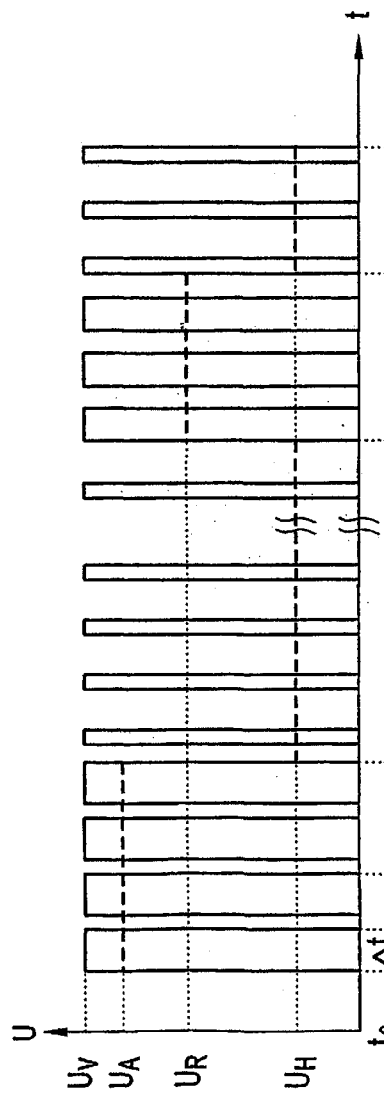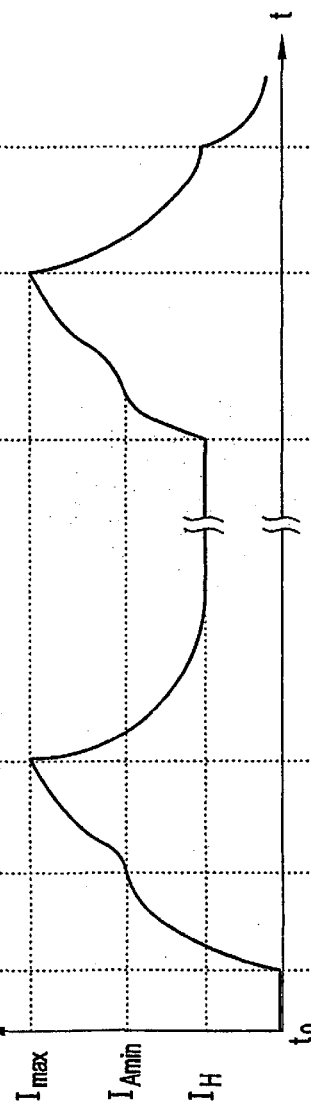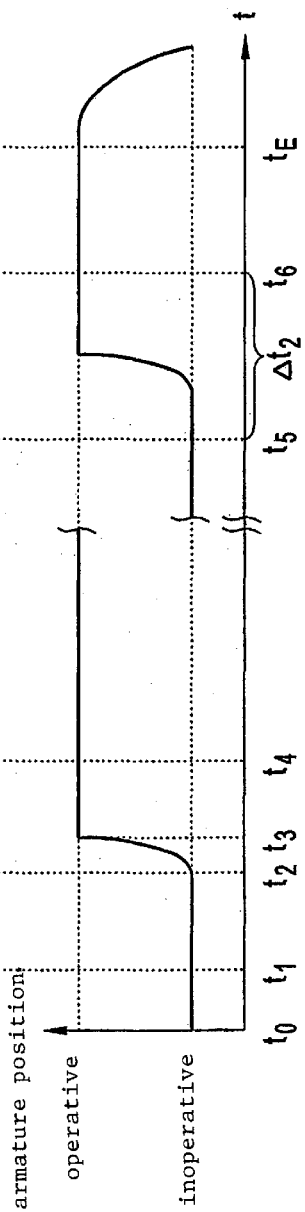

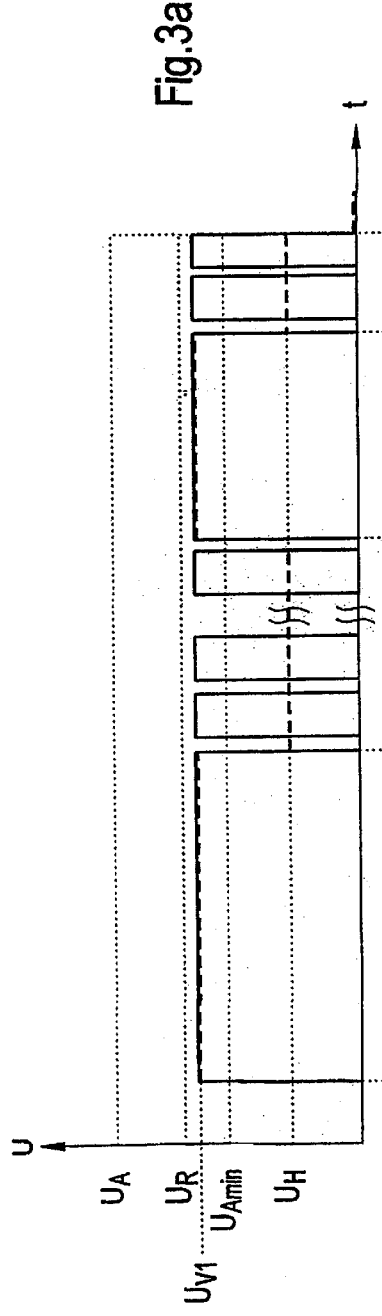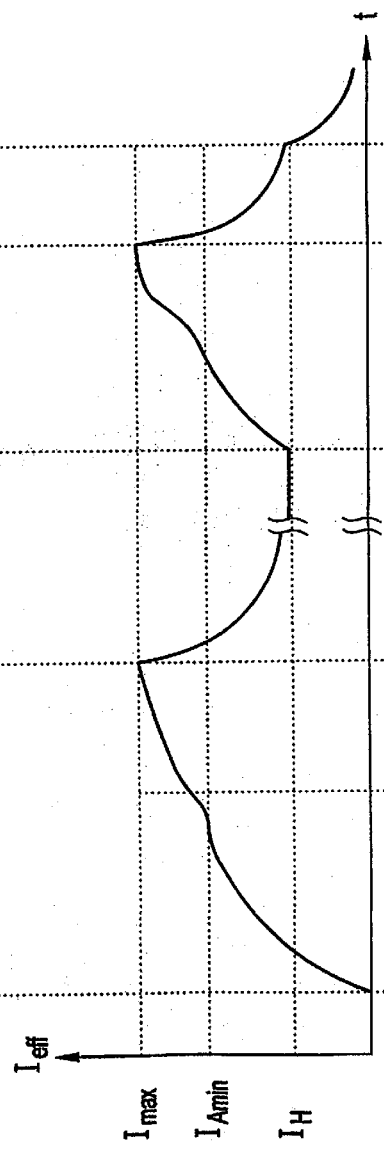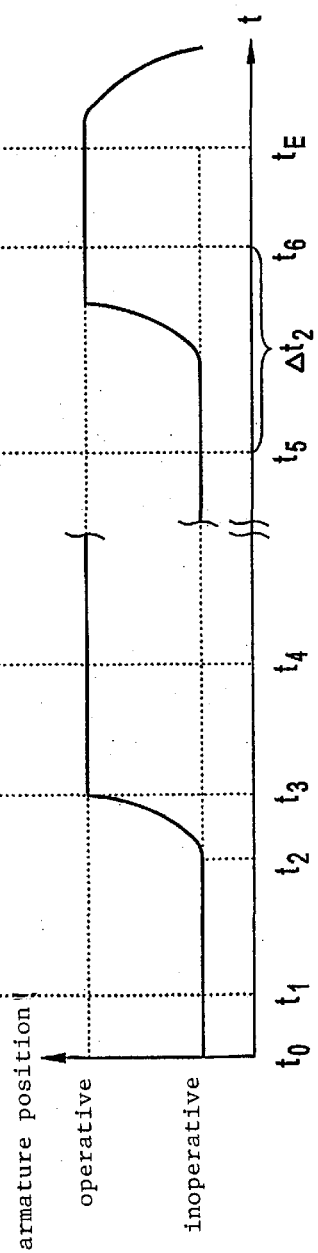

SYSTEM FOR CONTROLLING BRAKE VALVES

CROSS-REFERENCE TO RELATED APPLICATIONS

This application is a continuation of PCT Application No. PCT/EP01/13581 filed on Nov. 22, 2001.

BACKGROUND AND SUMMARY OF THE INVENTION

In the case of modern braking systems for commercial vehicles, electrically controllable electro-pneumatic modulators (pressure control modules) are assigned to the individual wheel brakes. These modulators control the brake pressure into the brake cylinders corresponding to the driver's braking demand. The pressure control modules each have an electro-magnetic switching valve, which switches in a pulse-type manner and operates to allow storage air into the control chamber of a relay part to vent it.

For a brake pressure control which is as exact as possible, the same pulse times in every operating condition of the brake system, if possible, should cause the same brake pressure changes. In particular, independently of the momentary supply voltage, the same current flow should always exist in the electromagnet of the switching valve during a pulse. The reason is that it is endeavored to provide a brake pressure control system which can be used worldwide and by which different supply voltages between 9V and 36V can be controlled. For a sufficiently large "magnetic switching force", the magnet coils, while the supply voltages are low, must have low ohmic resistances. However, at high supply voltages, low resistances would result in very large coil currents.

In the case of pressure control modules, high "switching dynamics" are also required, for which the transmission cross-sections should be relatively large. However, in order to simultaneously achieve a good gradualness of the brake pressure, very short opening times should be possible. However, the valves must open up rapidly at the beginning of a pulse and drop again rapidly at the end so that a defined armature movement can still be accomplished with such short opening times. This has the result that first a large amount of energy, that is, a high magnetic flux, must flow very rapidly into the coil so that the armature lifts rapidly and reliably off the valve seat. At the pulse end, the energy stored in the coil should be reduced as fast as possible so that the armature can rapidly be moved back again by a restoring spring in order to seal-off the valve seat. This requires a magnet current which is as low as possible. Despite the required high switching dynamics, the magnets should have a high-percentage switch-on duration (ED), also at operating temperatures of approximately 80° C. This requires low currents.

It is an object of the invention to provide a system for controlling the brake pressure which meets the above-mentioned requirements.

This object is achieved by a system for controlling brake pressure valves which have a storage pressure input, a brake pressure output, an electromagnet and an armature. The armature can be operated by exciting the electromagnet, for opening-up or shutting-off the storage pressure input with respect to the brake pressure output. The system includes a voltage source and an electronic control system for pulse-type excitation of the electromagnet. A measuring device is included for determining the actually present supply voltage. The electronic control system in order to generate a defined opening or closing movement sequence of the armature, generates voltage pulses for exciting the electromagnet and varies the pulse times as a function of the actually existing supply voltage. Advantageous developments and further developments of the invention are described herein.

The basic principle of the invention consists of the fact that, during operation, the supply-voltage available for controlling the electromagnet of the brake valve is continuously measured and the active value of the voltage present at the coil of the electromagnet is varied by the variation of the "pulse duty factor", that is, the pulse times as a function of the actually present supply voltage.

In other words, for generating a desired opening or closing sequence of the armature, the pulse duty factor is adjusted by an electronic control system as a function of the momentary supply voltage. The variation of the pulse duty factor can be implemented by the variation of the "width", that is, the duration of the voltage pulses, and/or by the variation of the duration of the non-excited states situated in-between.

In this case, the magnet is designed such that, also at the lowest possible supply voltage occurring during the operation, the magnet still attracts reliably and rapidly; that is, that a defined minimum attraction current $I_{Amin}$ is clearly exceeded.

By using an electronic control system, the active value of the control voltage of the electromagnet is controlled by the adaptation of the excitation timing such that, at the start of the pulse, a defined attraction voltage $U_A$ is always present at the electromagnet. For this purpose, the pulse duty factor is correspondingly adjusted as a function of the momentary supply voltage $U_V$.

After a certain attraction time, the armature has securely been pulled-in completely. In order to hold the armature in the operated position, a much lower holding current $I_H$ and thus also a lower active voltage is required which, in the following, will be called a holding voltage $U_H$. After the attraction voltage $U_A$ has been present at the electromagnet for a defined time period, the pulse duty factor is adjusted as a function of the supply voltage $U_V$ such that the holding voltage $U_H$ is set. As a result, the magnetic current $I_H$, and thus the energy stored in the magnet coil, will fall, whereby the percentage of the switch-on time duration is increased. The now lower energy can be reduced more rapidly at the end of the pulse, which improves the switching dynamics.

Other objects, advantages and novel features of the present invention will become apparent from the following detailed description of the invention when considered in conjunction with the accompanying drawings.

BRIEF DESCRIPTION OF THE DRAWINGS

FIG. 2a is a voltage versus time-dependency diagram of a first embodiment of the invention;

FIG. 2b is a current versus time-dependency diagram corresponding to FIG. 2a;

FIG. 2c is an armature position versus time-dependency diagram corresponding to FIGS. 2a and 2b, respectively;

FIG. 3a is a voltage versus time-dependency diagram of a second embodiment of the invention;

FIG. 3b is a current versus time-dependency diagram corresponding to FIG. 3a; and FIG. 3c is an armature position versus time-dependency diagram correspond to FIGS. 3a and 3b, respectively.

DETAILED DESCRIPTION OF THE DRAWINGS

Figure 1:
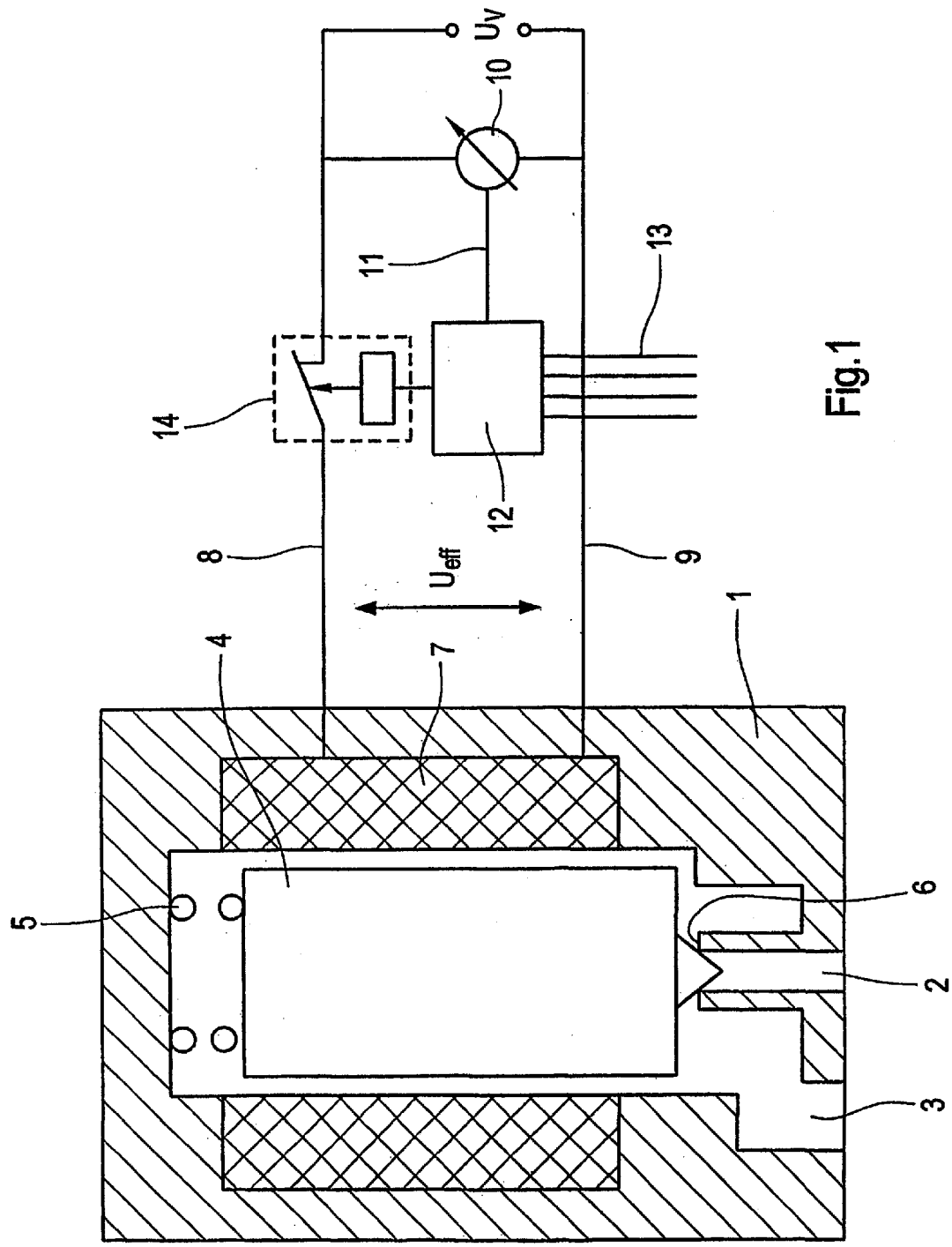
FIG. 1 is a schematic view of a system according to the invention.

FIG. 1 illustrates a brake pressure control valve having a housing 1, a storage pressure input 2 and a brake pressure output 3. In the housing 1, an armature 4 is arranged, which is prestressed by a spring 5 and, non-excited in the condition of the brake pressure control valve shown here, is pressed against a valve seat 6, so that the storage pressure input 2 is shut-off with respect to the brake pressure output 3. In the housing 1, an electromagnet 7 is also arranged, which can be connected with a supply voltage $U_V$ by way of electric lines 8, 9. In the excited state, the electromagnet 7 exercises a force counteracting the spring 5 upon the armature, so that the armature 4 lifts-off the valve seat 6 and the storage pressure input 2 is connected through to the brake pressure output 3.

In addition, a voltmeter 10 is provided. The voltmeter 10 continuously measures the supply voltage $U_V$ and supplies the measuring result by way of a line 11 to an electronic control system 12. Furthermore, by way of lines 13, different input signals are supplied to the electronic control system 12, such as a braking demand signal defined by the driver by way of the brake pedal, rotational wheel speed signals supplied by rotational wheel speed sensors, etc. As a function of the measured supply voltage $U_V$ and the input signals 13, the electronic control system 12 controls a switching device 14, which is shown here only schematically. The switching device 14 is designed to effect a rapid pulse-type switching; that is, the active voltage $U_{eff}$ present at the electromagnet 7 can be varied by varying the pulse duty factor, that is, the timing of the switching device 14 as a function of the supply voltage $U_V$.

By varying the pulse duty factor defined by the electronic control system 12, the active voltage $U_{eff}$ present at the electromagnet 7 can therefore be varied. A defined desired opening or closing movement sequence of the armature 4 can therefore be achieved solely by adapting the pulse duty factor even in the case of a different supply voltage $U_V$ or a supply voltage $U_V$ which fluctuates during the operation.

As an alternative to the embodiment illustrated here, in which the supply voltage $U_V$ is measured, the voltage momentarily present at the electromagnet 7 or the resulting active voltage $U_{eff}$ could also be measured and be used for controlling the pulse duty factor.

The switching operations will now be explained in detail in connection with FIGS. 2a to 2c.

The following voltage levels are entered in the voltage time-dependency diagram of FIG. 2a:

$U_V$: supply voltage;
$U_A$: attraction voltage of the armature;
$U_H$: holding voltage of the armature; and
$U_R$: refresh voltage.

In the current time-dependency diagram of FIG. 2b, the active current $I_{eff}$ flowing in the electromagnet is shown a as function of the time, the following active currents being entered:

$I_{max}$: the current flowing at the maximal excitation of the electromagnet;
$I_{Amin}$: the minimal current required for attracting the armature; and
$I_H$: the holding current required for holding the armature.

In the time between $t_0$ and $t_1$, the electromagnet is not excited, and the armature is in its inoperative position (shown in FIG. 1). At the point in time $t_1$, the electromagnet is excited by means of a supply voltage pulse $U_V$ of a "width" or duration $\Delta t$. As illustrated in FIG. 2a, in the time interval $t_1$ to $t_4$, four voltage pulses of this type are superimposed. The width of the voltage pulses and the duration of the non-excited states situated in-between the pulses are defined by the electronic control system such that an active voltage is present at the magnet, which here is called the attraction voltage $U_A$ and which is lower than the supply voltage $U_V$.

In the time interval $[t_1, t_4]$ shown, it takes until the point in time $t_2$ before the current I has risen to a minimum attraction current $I_{Amin}$ in the magnet. Correspondingly, the armature 4 remains in its inoperative position until the point in time $t_2$. In other words, only at the coil current $I_{Amin}$ will the intensity of the magnetic field be sufficiently high so that the armature can be moved against the spring force 5. In the time interval $[t_2, t_3]$, the armature is operated by the magnetic force against the spring force and changes into its excited state. Up until the point in time $t_4$, the coil current $I_{max}$ flowing in the electromagnet increases correspondingly to the value of the applied active voltage, that is, the attraction voltage $U_A$.

When the armature has been fully pulled-in, it only needs to be held in this position, which is possible using a lower magnetic force, that is, a lower active voltage and a lower current. For this purpose, the "width" of the voltage pulses is reduced at the point in time $t_4$ (or the time period between the voltage pulses in which the electromagnet is not excited is increased), which is illustrated in FIG. 2a. By varying the pulse duty factor, the active voltage present at the electromagnet is reduced to the holding voltage $U_H$ (shown by a bold dashed line). As a result, the current flowing in the electromagnet illustrated in FIG. 2b will also decrease to a value $I_H$, without any changes taking place with respect to the position of the armature.

In the event that the armature unintentionally drops as a result of high external accelerations or other disturbing influences, cyclically or when such a drop is recognized, for a time period $\Delta t_1$, as a result of a variation of the pulse duty factor, a higher active voltage, which is called a "refresh voltage" $U_R$, can again be applied. In the "refresh time interval" $[t_5, t_6]$, the width of the voltage pulses is enlarged so that the active voltage present at the electromagnet increases from $U_H$ to $U_R$. Correspondingly, in the time interval $[t_5, t_6]$, the current also rises from $I_H$ to $I_{max}$, and the armature thereby returns to its operative position. After this "refresh phase", the pulse duty factor is changed again such that the active voltage present at the electromagnet is equal to the holding voltage $U_H$ and the coil current therefore falls back to $I_H$.

At the point in time $t_E$, the brake valve is completely deactivated; that is, the voltage or the current are switched off so that, after a brief delay time following $t_E$, the armature falls back into its inoperative position, as illustrated in FIG. 2c.

FIGS. 3a to 3c show the case in which the supply voltage falls to a value $U_{V1}$, which is lower than the attraction voltage $U_A$ but higher than the minimum attraction voltage $U_{Amin}$. In this case, even at a pulse duty factor of 100%, that is, when the supply voltage is permanently switched on, the attraction voltage $U_A$ would not be reached. In this case, the armature can nevertheless be pulled-in when the attraction time defined by the electronic control system is extended to a time period $[t_1, t_4]$, the attraction operation of the armature starting at the point in time $t_2$ and the armature being fully pulled-in at the point in time $t_3$. Analogous to FIGS. 2a to 2c, here also, the attraction voltage continues to be maintained, in which case a maximal attraction current $I_{max}$ corresponding to the reduced supply voltage $U_{V1}$ occurs at the point in time $t_4$.

When the armature is completely pulled in, corresponding to FIGS. 2a to 2c, the holding voltage or the holding current is reduced to $U_H$ or $I_H$. The reduction of the active voltage to $U_H$ takes place corresponding to FIG. 3c in the time interval [$t_4$, $t_5$] by a variation of the pulse duty factor, that is, by a pulse-type action upon the electromagnet by the reduced supply voltage $U_{V1}$.

Also in the case illustrated in FIGS. 3a to 3c of a reduced supply voltage $U_{V1}$, which is lower than the refresh voltage $U_R$, a "refresh" can still be carried out. However, in contrast to FIGS. 2a to 2c, the time period $\Delta t_1$ (FIG. 2c) is increased here to $\Delta t_2$, so that the refreshing operation takes slightly longer. A limit for the supply voltage is the minimum attraction voltage $U_{Amin}$ of the magnet valve.

Analogous to FIGS. 2a to 2c, after the refreshing, at the point in time $t_6$, the pulse duty factor is changed again so that the active voltage falls again to the holding voltage $U_H$, and the active current falls again to $I_H$. At the point in time $t_E$, the voltage or the current is switched off, and the armature returns to its inoperative starting position.

FIGS. 2a and 3a show that the "high" active voltage $U_A$ or $U_{V1}$ is applied to the electromagnet only for a limited time. Consequently, on the average, the current load of the coil of the electromagnet is very low and the permissible switch-on duration (E) percentage is considerably increased.

All above-mentioned values for voltages, currents, times, pulse duty factors, etc. are experimentally or in another suitable manner determined beforehand and are stored in a memory device of the electronic control system. During the operation, only a determination of the supply voltage $U_V$ will then still be required.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for controlling a brake pressure valve having a storage pressure input, a brake pressure output, an electromagnet and an armature, the armature being operable by excitation of the electromagnet for opening-up or shutting-off the storage pressure input with respect to the brake pressure output, the system comprising:
   a voltage source;
   an electronic control system for controlling a pulse-type excitation of the electromagnet; and
   a measuring device for measuring an actually present supply voltage of the voltage source, wherein the electronic control system generates voltage pulses for exciting the electromagnet in order to generate a defined opening or closing movement sequence of the armature, the electronic control system varying pulse times as a function of the actually present supply voltage.

2. The system according to claim 1, wherein the electronic control system varies at least one of a duration of the voltage pulses and non-excited states situated in-between the voltage pulses.

3. The system according to claim 1, wherein the electromagnet is excited such that, at a start of the opening or closing movement of the armature, an active value of the voltage present at the electromagnet is equal to a defined attraction voltage ($U_A$) which is higher than a minimum attraction voltage ($U_{Amin}$) of the armature.

4. The system according to claim 2, wherein the electromagnet is excited such that, at a start of the opening or closing movement of the armature, an active value of the voltage present at the electromagnet is equal to a defined attraction voltage ($U_A$) which is higher than a minimum attraction voltage ($U_{Amin}$) of the armature.

5. The system according to claim 1, wherein when the armature is pulled-in, the electromagnet is excited such that an active value of the voltage present in the pulled-in armature position at the electromagnet is equal to a defined holding voltage ($U_H$) which is lower than the attraction voltage ($U_A$).

6. The system according to claim 2, wherein when the armature is pulled-in, the electromagnet is excited such that an active value of the voltage present in the pulled-in armature position at the electromagnet is equal to a defined holding voltage ($U_H$) which is lower than the attraction voltage ($U_A$).

7. The system according to claim 3, wherein when the armature is pulled-in, the electromagnet is excited such that an active value of the voltage present in the pulled-in armature position at the electromagnet is equal to a defined holding voltage ($U_H$) which is lower than the attraction voltage ($U_A$).

8. The system according to claim 1, wherein the electromagnet and the armature are dimensioned such that the armature pulls-in at a lowest possible supply voltage occurring during the operation.

9. The system according to claim 6, wherein excitation of the electromagnet is varied such that an active voltage ($U_R$) is present at the electromagnet which is higher than the holding voltage ($U_H$) and lower than the attraction voltage ($U_A$).

10. The system according to claim 7, wherein excitation of the electromagnet is varied such that an active voltage ($U_R$) is present at the electromagnet which is higher than the holding voltage ($U_H$) and lower than the attraction voltage ($U_A$).

11. The system according to claim 5, wherein excitation of the electromagnet is varied such that an active voltage ($U_R$) is present at the electromagnet which is higher than the holding voltage ($U_H$) and lower than the attraction voltage ($U_A$).

12. The system according to claim 1, wherein a pressure sensor is provided for measuring the actual storage pressure and a pressure sensor is provided for measuring the actual brake pressure.

13. The system according to claim 2, wherein a pressure sensor is provided for measuring the actual storage pressure and a pressure sensor is provided for measuring the actual brake pressure.

14. The system according to claim 3, wherein a pressure sensor is provided for measuring the actual storage pressure and a pressure sensor is provided for measuring the actual brake pressure.

15. The system according to claim 5, wherein a pressure sensor is provided for measuring the actual storage pressure and a pressure sensor is provided for measuring the actual brake pressure.

16. The system according to claim 6, wherein a pressure sensor is provided for measuring the actual storage pressure and a pressure sensor is provided for measuring the actual brake pressure.

17. The system according to claim 1, wherein an electronic memory is provided which is connected with the electronic control system, characteristic diagrams being stored in the memory by which, from actually present brake system parameters, desired pulse times or desired pulse frequencies are obtainable for controlling the electromagnet.

18. The system according to claim 2, wherein an electronic memory is provided which is connected with the electronic control system, characteristic diagrams being stored in the memory by which, from actually present brake system parameters, desired pulse times or desired pulse frequencies are obtainable for controlling the electromagnet.

19. The system according to claim 3, wherein an electronic memory is provided which is connected with the electronic control system, characteristic diagrams being stored in the memory by which, from actually present brake system parameters, desired pulse times or desired pulse frequencies are obtainable for controlling the electromagnet.

20. The system according to claim 17, wherein the actually present brake system parameters include a momentary actual brake pressure and an actual storage pressure.

21. The system according to claim 18, wherein the actually present brake system parameters include a momentary actual brake pressure and an actual storage pressure.

22. The system according to claim 19, wherein the actually present brake system parameters include a momentary actual brake pressure and an actual storage pressure.

23. The system according to claim 17, wherein the electronic control system modifies the stored desired pulse times or desired pulse frequencies according to actually learned parameters.

24. A method for controlling a brake pressure valve having a storage pressure input, a brake pressure output, an electromagnet and an armature, wherein an electronic control system controls a voltage source coupled to the electromagnet in a pulse-type excitation manner, the method comprising the acts of:

measuring an actually present supply voltage and providing the actually present supply voltage to the electronic control system;

generating voltage pulses for exciting the electromagnet by the electronic control system for a defined opening/closing movement sequence of the armature, the electronic control system varying pulse times as a function of the actually present supply voltage.

25. The method according to claim 24, wherein the act of varying the pulse times is carried out by varying at least one of a duration of the voltage pulses and a non-excitation state arranged in-between the voltage pulses.

26. The method according to claim 24, wherein the act of generating voltage pulses for exciting the electromagnet further comprises the act of maintaining an active value of the voltage present at the electromagnet equal to a defined attraction voltage which is higher than a minimum attractive voltage of the armature at the start of the opening/closing movement of the armature.

27. The method according to claim 26, wherein when the armature is pulled-in, the electronic control system excites the electromagnet such that an active value of the voltage present in the pulled-in armature position at the electromagnet is equal to a defined holding voltage which is lower than the attraction voltage.

28. The method according to claim 27, wherein the electronic control system varies excitation of the electromagnet such that an active voltage is present at the electromagnet which is higher than the holding voltage and lower than the attraction voltage.

* * * * *